United States Patent [19]

Fukuda et al.

[11] Patent Number: 4,824,730
[45] Date of Patent: Apr. 25, 1989

[54] IR RADIATION HEATING ELEMENT

[75] Inventors: Akio Fukuda, Nara; Yasunori Kaneko, Shiki; Masao Maki, Nabari; Mamoru Isogai, Nara, all of Japan

[73] Assignee: Matsushita Electric Industrial Co., Ltd., Osaka, Japan

[21] Appl. No.: 209,638

[22] Filed: Jun. 21, 1988

Related U.S. Application Data

[63] Continuation-in-part of Ser. No. 098,993, Sep. 21, 1988, abandoned.

[30] Foreign Application Priority Data

Sep. 19, 1986 [JP] Japan .......................... 61-223007
Oct. 16, 1986 [JP] Japan .......................... 61-245723

[51] Int. Cl.$^4$ .............................................. B32B 9/04
[52] U.S. Cl. ...................................... 428/447; 219/553
[58] Field of Search ....................... 428/450, 447, 446; 219/553; 528/4, 5

[56] References Cited

U.S. PATENT DOCUMENTS 4,361,679 11/1982 Yajima et al. ........................ 525/389
4,405,687 9/1983 Murita et al. ........................ 428/383

Primary Examiner—Theodore Morris
Attorney, Agent, or Firm—Wenderoth, Lind & Ponack

[57] ABSTRACT

An IR radiation heating element comprising a substrate and a coating film formed thereon from a coating composition for IR radiation heating which comprises an oxide of a transition metal or a mixed oxide of transition metals, $ZrO_2$ and polyborosiloxane, which element has improved IR radiation efficiency when heated.

12 Claims, 5 Drawing Sheets 4,824,730

IR RADIATION HEATING ELEMENT

CROSS REFERENCE TO RELATED APPLICATION

This is a continuation-in-part of application Ser. No. 098,993, filed Sept. 21, 1988 now abandoned.

BACKGROUND OF THE INVENTION

1. Field of the Invention

The present invention relates to an IR radiation heating element which comprises a substrate and a coating film formed from a coating composition for IR radiation heating.

2. Description of the Prior Arts

Many coating film having various compositions are known and prepared as IR radiation heating coating film. When the coating composition for IR radiation heating is applied and dried to form a film on a hard surface, particularly a metal surface, it can radiate IR at high efficiency. One example of such coating composition for IR radiation heating comprises an inorganic binder consisting of alumina or silica and an oxide of a transition metal such as iron, cobalt, nickel, copper and titanium. The coating composition is applied on a surface of a heating element, dried and then sintered to form a coating having a thickness of several ten to several hundred μm on the heater surface. Another example of the coating composition for IR radiation heating comprises water glass and an oxide, carbide or nitride of a metal such as zirconium, silicon, aluminum, iron, chromium, nickel, cobalt, titanium or manganese. This composition is coated on the surface of the heating element, dried at a temperature at which the water glass hardens and sintered to form a coating film having a thickness of several ten to several hundred μm. The heating element having the coating film for IR radiation heating on its surface is widely used as heating means for industrial or domestic use.

The reason why the ceramic type coating film comprising the oxide, carbide or nitride of the metal is used for IR radiation heating is that its IR radiation characteristics is superior to the metal. FIG. 1 shows radiation characteristics of three kinds of surfaces, in which the curves 1 to 3 represent spectroradiation characteristic curves for the surfaces of following materials, respectively:

1: Stainless steel
2: Coating film comprising $ZrO_2$, $SiO_2$ and $Al_2O_3$
3: Coating film comprising a transition metal oxide (e.g. $Fe_2O_3$, $Mn_2O_3$ and $Cr_2O_3$), $ZrO_2$, $SiO_2$ and $Al_2O_3$ As understood from these characteristic curves, The stainless steel 1 has lower emissivity than the coating films 2 and 3 at all the wavelengths specified in FIG. 1. The coating 2 has higher emissivity in a longer wavelength range. The coating 2 has high emissivity at all wavelengths. From these results, it is apparent that the coatings 2 and 3 can give a more amount of radiation heat than the stainless steel when the same amount of heat is input to the heating element from a heat source.

However, the conventional ceramic type coating films for IR radiation heating still have some drawbacks. The first drawback is that design of the coating film is difficult since little is known about a relationship between the radiation characteristics and coating conditions such as a formulation of the composition and a thickness of the coating film. The second one is that since the coating film comprises the ceramics, it has poor resistance against mechanical shock so that it tends to be easily cracked or peeled off from the surface of the heating element when external stress such as flexure is applied thereon. Further, the ceramic coating tends to be cracked or peeled off by thermal shock if the substrate deforms thereby. The third one is that when the coating composition is applied and dried to form the film on the heating element, the coating composition comprising the inorganic binder has poor wettability with the substrate and is repelled so that it is difficult to form a uniform coating film. Thus, the surface of the heating element should be pretreated in some steps, which makes the coating conditions more complicate. In addition, the organic binder should be heat resistant to be used as a part of the heating element. The fourth one is that, when the heating element is used at a high temperature, for example, when it is red heated at a temperature of 800° to 1,000° C., the coating components, particularly the inorganic binder is thermally deteriorated and the adhesion of the coating film to the substrate is decreased.

SUMMARY OF THE INVENTION

The present invention is intended to make clear a relationship between the coating composition and radiation characteristics so as to provide a coating composition for IR radiation heating which can form a coating film on a heating element having improved IR radiation characteristics and good film properties such as adhesivity and heat resistance.

According to the present invention, there is provided an IR radiation heating element comprising a substrate and a coating film formed thereon from a coating composition for IR radiation heating which comprises an oxide of a transition metal, $ZrO_2$ and polyborosiloxane.

Polyborosiloxane is a binder having good adhesivity even at a high temperature. According to the present invention, film properties such as hardness of the film and corrosion resistance of not only the coating but also the substrate can be controlled by properly selecting mixing conditions of the composition, sintering temperature and the thickness of the coating film.

DETAILED DESCRIPTION OF THE DRAWINGS

Figure 2:
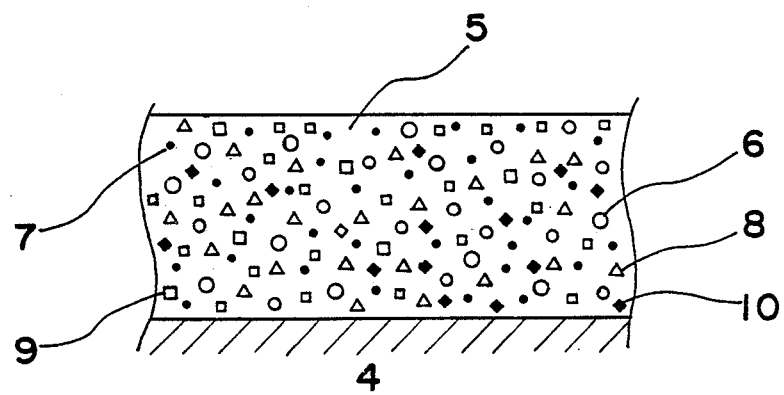
FIG. 2 is an enlarged schematic cross section of one embodiment of the coating film according to the present invention.

FIG. 2 shows an enlarged schematic cross section of one embodiment of the coating film formed from the coating composition of the present invention on a substrate 4. The coating film comprises polyborosiloxane 5 as a binder, $ZrO_2$ 6, $Fe_2O_3 \cdot Mn_2O_3 \cdot CuO$ 7, $Al_2O_3$ 8, MgO 9 and mica 10, and has a thickness of 10 to 20 μm.

When the substrate is heated externally or internally, the temperature of the coating film is raised and the coating film emits radiation heat.

In the coating of FIG. 2, $Al_2O_3$ 8 is used for filling the space among other components, MgO 9 is used for neutralizing foreign materials to improve the corrosion resistance, and mica 10 is of flake form and used to physically prevent penetration of the foreign materials. These components, namely $Al_2O_3$, MgO and mica are optional ones.

The embodiment of FIG. 2 is explained in connection with a practical application. For example, the substrate 4 can be a metal plate constituting an inner wall of an electric oven. An electric heater is installed outside this metal plate, and the coating film for IR radiation heating is formed on the inner surface of the metal plate. When electric current is passed through the electric heater and the metal plate is heated, radiation of the generate heat is facilitated by the coating film for IR radiation heating and emitted from the surface of the coating film into an interior of the electric oven. By the radiated heat, food is thermally cooked.

Figure 1:
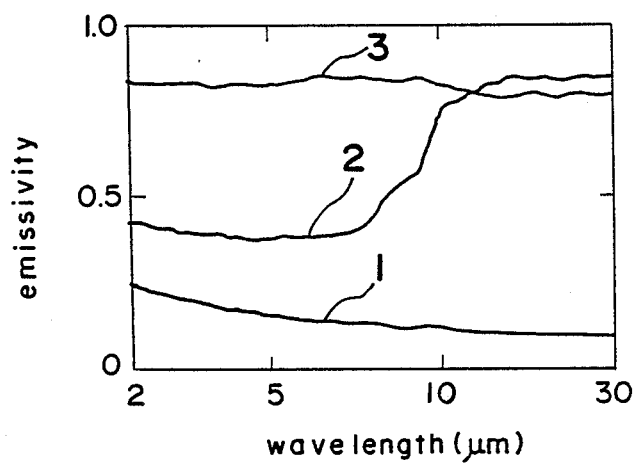
FIG. 1 is a graph showing IR emissivity of three kinds of surfaces.
Figure 3:
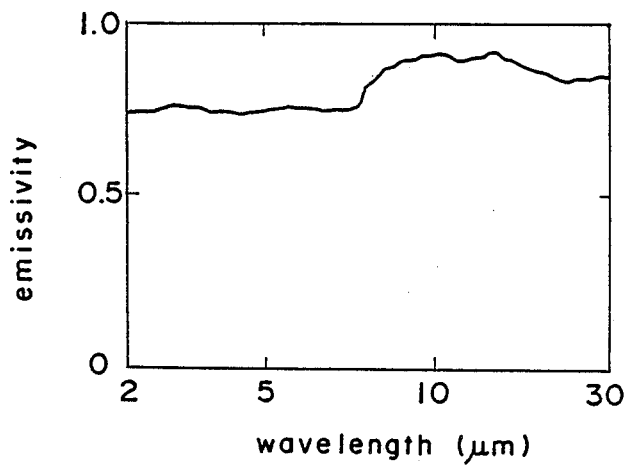
FIG. 3 is a graph showing IR emissivity of the coating film shown in FIG. 2.

FIG. 3 is a graph showing radiation characteristics of the coating shown in FIG. 2. The characteristic curve is similar to the curve 2 in FIG. 1 for the coating 2. However, the thickness of the coating according to the present invention is smaller than that of the coating 2. The conventional coating cannot provide high emissivity when its thickness is as small as 10 to 20 μm.

Polyborosiloxane to be used as a binder according to the present invention may be represented by the formulas:

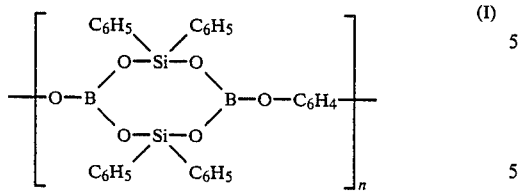

wherein n is 41 to 48.

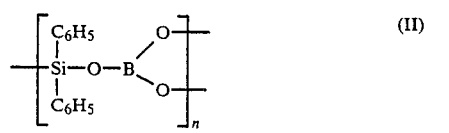

Preferably, the polyborosiloxane has an average molecular weight of from $1 \times 10^4$ to $5 \times 10^4$, more preferably from $2 \times 10^4$ to $3 \times 10^4$ (as converted to polystyrene).

Polyborosiloxane (I) or (II) has a backbone chain comprising silicon, boron and oxygen atoms and phenyl groups as side chains bonded to the silicon atoms in the backbone chain. A molecular weight of polyborosiloxane has not been precisely measured.

Since polyborosiloxane has phenyl groups and is soluble in a strongly polar solvent such as NMP and DMF, it is used in the form of a solution in such solvent. The solution form of polyborosiloxane makes easy the preparation of the coating composition and application thereof. Therefore, polyborosiloxane has far better handling properties than the conventionally used inorganic binder.

Polyborosiloxane may be produced by the method disclosed in U.S. Pat. No. 4,405,687 to Morita et al., the disclosure of which is hereby incorporated by reference.

Figure 4:
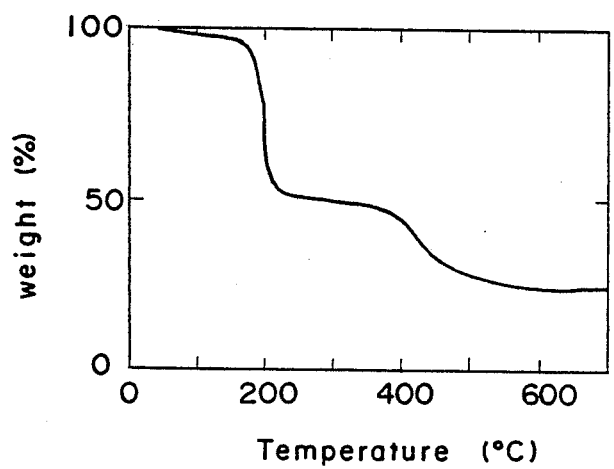
FIG. 4 is a graph showing weight loss of a solution of polyborosiloxane by thermogravimetric analysis.

FIG. 4 shows results of thermogravimetric analysis of a solution of polyborosiloxane in NMP. Weight loss up to about 200° C. is due to evaporation of NMP. In a temperature range higher than about 200° C., the weight loss is attributed to the loss of the phenyl groups due to scission of the bonding between the phenyl group and the silicon atom. At a temperature higher than about 600° C., no weight loss is found, and a residual material is a ceramic consisting of silicon, boron and oxygen atoms, which realizes the strong adhesion between the coating and the substrate.

The various advantageous properties of the coating film for IR radiation heating according to the present invention is now illustrated.

The formulation of the coating composition and the radiation characteristics is firstly described.

Figure 5:
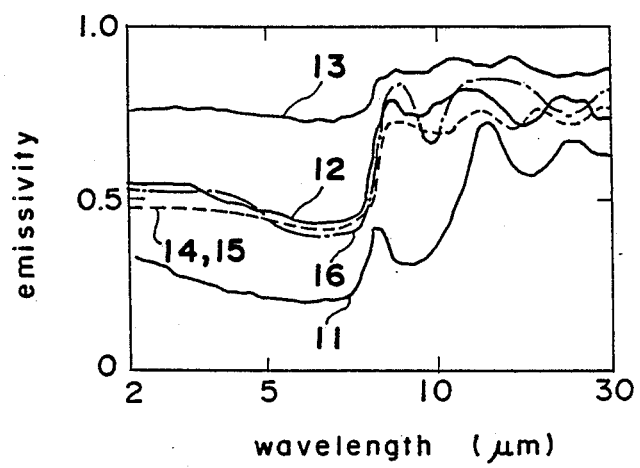
FIG. 5 is a graph showing IR emissivity of various coating films.

FIG. 5 shows radiation characteristic curves for various coating compositions, formulations of which are shown in Table 1.

TABLE 1

| | Composition No. | | | | | |
|---|---|---|---|---|---|---|
| | 1 | 2 | 3 | 4 | 5 | 6 |
| Curve No. in FIG. 5 | 11 | 12 | 13 | 14 | 15 | 16 |
| polyborosiloxane | Yes | Yes | Yes | Yes | Yes | Yes |
| $ZrO_2$ | No | Yes | Yes | Yes | Yes | Yes |
| $Fe_2O_3 \cdot Mn_2O_3 \cdot CuO$ | No | No | Yes | No | No | No |
| $Al_2O_3$ | No | No | No | Yes | No | No |
| $SiO_2$ | No | No | No | No | Yes | No |
| $TiO_2$ | No | No | No | No | No | Yes |
| Film*[1] thickness (μm) | ca. 5 | ca. 10 | ca. 10 | ca. 10 | ca. 10 | ca. 10 |

Note:
*[1]Coated on a plate of stainless steel 430, and sintered at 600° C.

From the results of FIG. 5, it is seen that $Fe_2O_3 \cdot Mn_2O_3 \cdot CuO$ improves the emissivity in a shorter wavelength range. This is because $Fe_2O_3 \cdot Mn_2O_3 \cdot CuO$ has good IR absorption. In addition, since $ZrO_2$, $Al_2O_3$, $SiO_2$ and $TiO_2$ have characteristic absorption in a longer wavelength range, they contribute to the high emissivity in the longer wavelength range. $Al_2O_3$, $SiO_2$ and $TiO_2$ have substantially the same emission characteristics in the mixed system with $ZrO_2$. The reason why $ZrO_2$ is used as one of the essential components according to the present invention is as follows:

When one of $Al_2O_3$, $SiO_2$, $TiO_2$, $V_2O_5$, $Fe_2O_3$, NiO, $Y_2O_3$, $ZrO_2$, $La_2O_3$, $Co_2O_3$, CoO, $Mn_2O_3$, $MnO_2$, CuO, $Cu_2O$ and $Cr_2O_3$ is used in combination with polyborosiloxane, the coating film comprising $ZrO_2$ has better radiation characteristics than coating films comprising other oxides. For example, the coating film comprising $ZrO_2$ is used in a grill, a slice of bread can be toasted faster than other coating films. Therefore, according to a preferred embodiment of the present invention, the coating composition for IR radiation heating comprises polyborosiloxane, $ZrO_2$ and $Fe_2O_3.Mn_2O_3.CuO$. In another preferred embodiment, the coating composition further comprises, as an auxiliary, $Al_2O_3$ which is thermally stable and cheap.

The particle size of $ZrO_2$ is preferably from 0.1 to 2 $\mu m$, more preferably from 0.2 to 0.8 $\mu m$. To obtain a coating film having the thickness of 10 to 20 $\mu m$, $ZrO_2$ having a larger particle size is not suitable. When $ZrO_2$ having a particles sizes of 0.2 $\mu m$ or 0.8 $\mu m$ was used, there was no noticeable difference in the radiation characteristics in the wavelength range in which the test was carried out.

Figure 6:
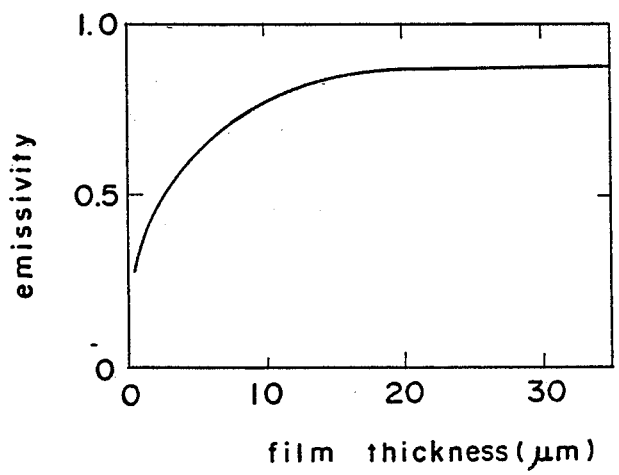
FIG. 6 is a graph showing a relationship between the average emissivity and the thickness of the coating film.
Figure 7:
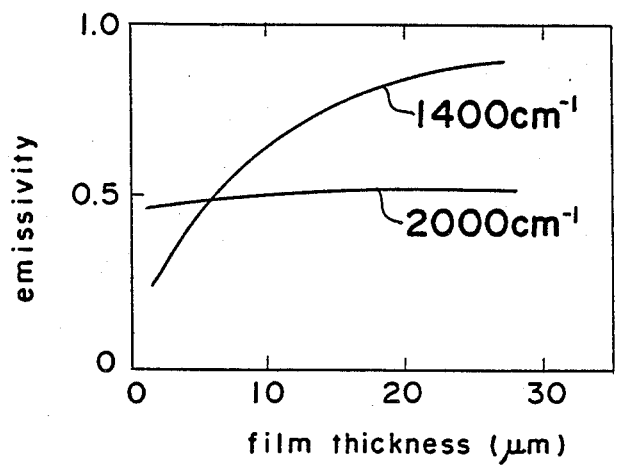
FIG. 7 is a graph showing influence of the wavelength of light on emissivity.

FIG. 6 shows a relationship between film thickness of the coating No. 2 in Table 1 and its average emissivity which is measured by a heat conduction type emissivity meter. When the coating film is thin, the emissivity is low because of influence of IR reflection by the substrate. When the coating has a thickness of 15 to 20 $\mu m$ or larger, the influence by the substrate is eliminated and the emissivity is stabilized. For the composition No. 3 in Table 1, the emissivity is stabilized when the film thickness is 10 $\mu m$ or larger. The influence of the wavelength is shown in FIG. 7. The emissivity of the coating No. 2 in Table 1 is plotted for the wave number of 2,000 $cm^{-1}$ and 1,400 $cm^{-1}$ against the film thickness. From FIG. 7, it is seen that the emissivity is not influenced by the film thickness in case of the wave number of 2,000 $cm^{-1}$, while the emissivity increases as the film thickness increases in case of the wave number of 1,400 $cm^{-1}$. This means that IR radiation at 1,400 $cm^{-1}$ penetrates deeper into the coating than that at 2,000 $cm^{-1}$ and therefore the former is more influenced by the substrate than the latter.

Preferably, the $ZrO_2$ particle surfaces are coated with $Al_2O_3$, $SiO_2$ or $TiO_2$. When a refractive index of the $ZrO_2$ particle is "n", a reflectance R is defined by the following equation:

$$R = \left(\frac{n-1}{n+1}\right)^2 \quad (III)$$

Therefore, the reflectance increases and the emissivity decreases as the refractive index increases. Since $ZrO_2$, $Al_2O_3$ and $SiO_2$ have refractive indexes of 2.2, 1.5 and 1.6, respectively, their reflectance are about 0.14, 0.04 and 0.05, respectively according to the equation (III). Although the equation represents regular reflection, the coating of $ZrO_2$ particle surfaces with $Al_2O_3$, $SiO_2$ or $TiO_2$ can reduce the reflectance of the $ZrO_2$ particle. The $Al_2O_3$, $SiO_2$ or $TiO_2$ coating should not so thick as to deteriorate the properties of $ZrO_2$. Its thickness is preferably about 10 Å or less.

The content of the particles in the coating film and the refractive index of the particle have following relationship. When the content of the particle is large, the refractive indexes of both of the surface and the inner part of the coating are close to that of the particles since the particles are densely packed in the coating film. According to the equation (III), the emissivity is large, when the refractive index is small. On the contrary, when the content of the particles is small, the particles are scarcely present in the coating film, so that the refractive index of the coating is close to that of the binder. In the present invention, since the refractive index of polyborosiloxane is as small as 1.5, one may think that the reflection R could be small according to the equation (III), and in turn the radiation characteristics of the coating film would be good. However, this is not the case. Since polyborosiloxane is porous, it tends to be easily affected by reflection effects of the substrate. Thus, it is preferred that the particles have a larger refractive index when they are contained in the substrate in a smaller ratio. The reason for this is as follows:

When the particles are contained in the coating film, IR light tends to be multiple scattered on the surfaces of the particles and during multiple scattering, it is absorbed by the coating film.

In view of the above phenomena, since $TiO_2$ has a larger refractive index of 2.8, it is suitable for coating the surfaces of the $ZrO_2$ particles. The larger absorbance means the larger radiation.

As explained in the above, the coating of the surfaces of the $ZrO_2$ particles with $Al_2O_3$, SiO and/or $TiO_2$ can play an important role in view of the relationship among the particle content in the coating film, the refractive index of the particles and the radiation characteristics of the coating film.

MgO and mica are optionally mixed in the coating film according to the present invention to improve the corrosion resistance of not only the coating but also the substrate.

Since polyborosiloxane is degassed during sintering, the coating film according to the present invention is porous. Therefore, in an corrosive atmosphere containing a corrosive gas or liquid, the surface of the metal substrate such as stainless steel is corroded, and the coating of the present invention is peeled off from the corroded part of the substrate. This is particularly true for the cooking utensils. On the surface of the cooking utensils, not only protons generated by seasonings such as sauce, oil such as salad oil, vinegar etc., but also halogen ions contribute to the corrosion of the substrate and the coating. The protons elute metal ions such as $Fe^{3+}$ and $Cu^{2+}$ from the metal oxide in the coating film and the eluted metal ions may act as oxidizing agents for corroding the metal surface, and the halogen ions directly corrode the metal surface. To prevent the elution of the metal ions from the coating film, basic MgO is added to suppress the attack by the protons. Since a mica particle has a plane form and is present in the coating in parallel with the surface of the coating, it can prevent the penetration of the corrosive material into the coating to some extent.

The coating film according to the present invention with or without MgO and mica was subjected to a moisture proof test and a seasoning corrosion test (for 24 hours). The results are shown in Table 2.

TABLE 2

| Coating film | Moisture proof | Seasoning corrosion |
|---|---|---|
| With MgO and mica | No corrosion | No corrosion |
| Without MgO or mica | Corroded, peeled | Corroded, peeled |

The preferred coating compositions which have satisfactory radiation characteristics and corrosion resistance are a composition Nos. 7 and 8 shown in Table 3.

TABLE 3

| | Composition No. (Parts by weight) | |
|---|---|---|
| | 7 | 8 |
| Polyborosiloxane*1 (45% solution) | 100 | 100 |
| $ZrO_2$ | 30 | 30 |
| $Fe_2O_3.Mn_2O_3.CuO$ | 20 | 20 |
| $Al_2O_3$ | 20 | 5 |
| MgO | 5 | 15 |
| Mica | 5 | 5 |
| Toluene | 100 | 100 |

Note:
*1Weight average molecular weight = $(2.5 \pm 0.2) \times 10^4$ (converted to polystyrene).

The coating films prepared from the coating composition Nos. 7 and 8 have substantially the same radiation characteristic curves as shown in FIG. 3.

Now, preparation, coating and sintering conditions and preservation conditions will be explained.

For this purpose, the coating composition No. 7 in Table 3 is used by way of example. The conditions and procedures explained in connection with the composition No. 7 can be applied to all other coating compositions according to the present invention with minor changes if required.

Preparation of the coating composition

Figure 8:
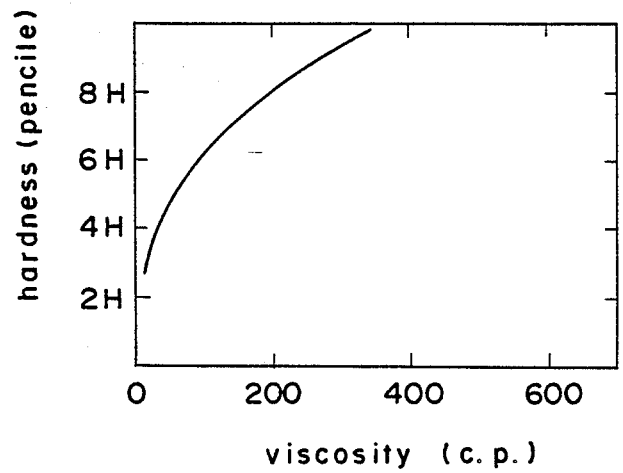
FIG. 8 is a graph showing a relationship between the viscosity of the coating composition and the hardness of the coating film prepared therefrom.
Figure 9:
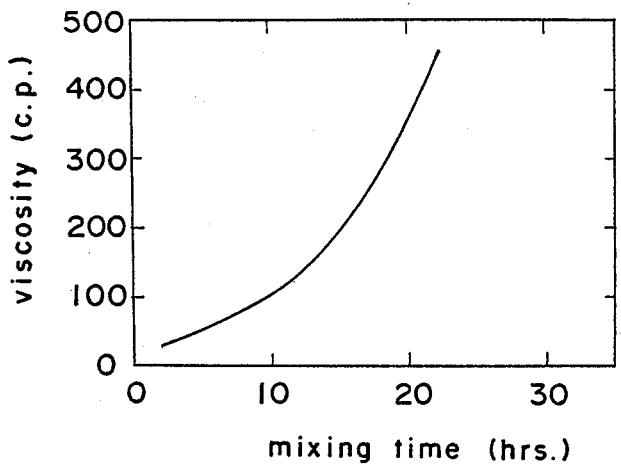
FIG. 9 is a graph showing a relationship between the viscosity and the mixing time of the coating composition, FIG. 10 schematically shows an apparatus which is used in a heating test of the coating film for IR radiation.

Since the coating composition according to the present invention contains powdery components in a larger content, preferably the components are vigorously dispersed. When the dispersion is insufficient in the preparation of the coating composition No. 7, the coating film formed therefrom is not hard enough and easily flawed. To evaluate a degree of dispersion, the relationship between a viscosity of the prepared coating composition (at 25° C.) and pencil hardness of the coating film was examined. The result is shown in FIG. 8. To obtain a sufficiently hard coating film, the coating composition is dispersed to have a viscosity of at least 50 cps, preferably at least 100 cps. Thereby, the coating film has pencil hardness of at least 5H. A relationship between a period of mixing time and the viscosity of the coating composition is shown in FIG. 9.

Sintering conditions

Preferably, a sintering temperature is not lower than 600° C. in view of the properties of polyborosiloxane. When the sintering temperature is lower than 600° C, the phenyl groups remain in polyborosiloxane so that the coating film may be deteriorated by the organic solvent and have poor hardness. For example, if the coating film is sintered at 400° C. or lower, its hardness is unsatisfactorily low.

Coating conditions and preservation conditions

Since the coating composition contains the organic solvent, it can be easily coated on the substrate as an organic solvent type paint by, for example, spray coating and dip coating. The pretreatment of the substrate is simple and can be carried out only by degreasing. The coating composition according to the present invention does not require any complicate pretreatment of the substrate that is required for the conventional inorganic coating. Since the polar solvent for polyborosiloxane (e.g. NMP) is hygroscopic, the coating composition of the present invention is preferably preserved and applied on the substrate in an atmosphere with low humidity.

The heating effect of the coating for IR radiation heating according to the present invention is now explained.

Figure 10:
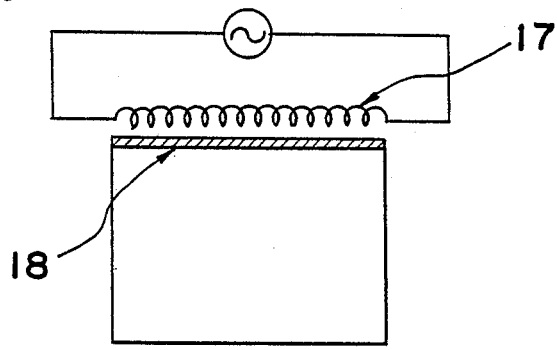
Figure 11:
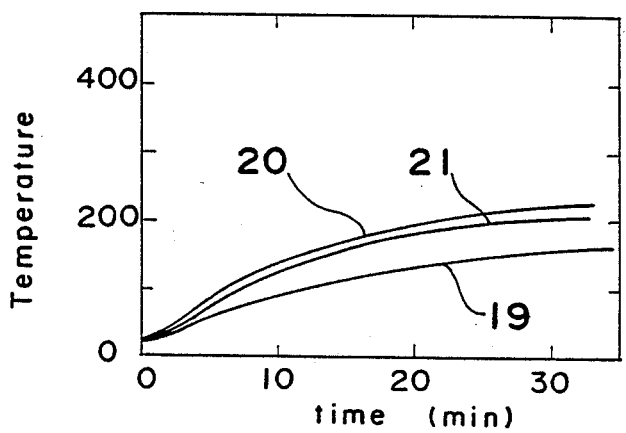
FIG. 11 is a graph showing the temperature increase curve for various heating surfaces.

FIG. 10 schematically shows an apparatus which is used in a heating test of the coating film for IR radiation heating. In this apparatus, a heater 17 heats a radiation surface 18 of the coating film, and generated radiation heat raises temperature of an interior of the apparatus. Temperature increase is measured at 27 points in the interior of the apparatus. The results for the stainless steel surface and the coating films according to the present invention (Coating composition Nos. 4 and 7) are shown in FIG. 11, which shows the results measured at the center part of the apparatus. In FIG. 11, the curves 19, 20 and 21 represent the results for the stainless steel, the composition No. 4 and the composition No. 7, respectively. As is apparent from the results, the presence of the coating film according to the present invention raises the temperature more quickly to higher temperature than the stainless steel surface. Since the radiation heating effect of the coating according to the present invention is superior to the uncoated stainless steel, the cooking test by using the apparatus of FIG. 10 is carried out. The cooking test is carried out with a sponge cake, gratin, etc. The cooking time was shortened by 30 to 40%.

The coating film according to the present invention is applied on an inner surface of a kiln for baking a paint coating and its efficiency is compared with a conventional ceramic type heater. The baking time is shown in Table 4.

TABLE 4

| Heater | Conventional | Present invention |
|---|---|---|
| Thickness of coating (μm) | >100 | 10–15 |
| Baking time (min.) | 30 | 15 |

In Table 4, "thickness of coating" is that of a coating for IR radiation, and "baking time" is that required for baking an organic paint.

As understood from these results, the paint coating can be baked by using the coating film according to the present invention in an about half of the baking time required for the conventional ceramic coating. Therefore, an amount of energy, a length of the kiln and a space for installing the kiln are reduced. In addition, the ceramic coating tends to be peeled off from the surface of the substrate of the heater and cannot be used for a long time. On the contrary, the coating of the present invention does not suffer from such peeling off.

The heating effect described in the above is due to high IR radiation effect of the coating film according to the present invention.

The adhesivity of the coating according to the present invention is demonstrated. The test procedures are as follows:

Test No. 1: The coated substrate is kept at 700° C. for 5 minutes and then immersed in water for 5 minutes. These procedures are repeated.

Test No. 2: The coating film is cut with a knife to form chess board like slits with a width of 1 mm and an adhesive tape is adhered thereon. Then, the adhesive tape is peeled off.

Test No. 3: The coated substrate is continuously kept at 700° C.

The results are summarized in Table 5.

TABLE 5

| Test No. | Result |
|---|---|
| 1 | No problem after 50 cycles |
| 2 | No piece was peeled off. |
| 3 | No problem after 1,000 hours |

In these tests, the coating composition No. 7 was used. The results show that the coating film according to the present invention has good adhesivity to the substrate. The coating according to the present invention can be used at a high temperature of 700° to 800° C. for a long time unless it is not heated under a very corrosive condition.

Although the above examples are illustrated with $Fe_2O_3 \cdot Mn_2O_3 \cdot CuO$ as the transition metal oxide, oxides of other transition metals such as cobalt, chromium and the like can be used according to the present invention, and various coating composition having different IR radiation characterisics can be prepared.

What is claimed is:

1. An IR radiation heating element comprising a substrate and a coating film formed on the substrate from a coating composition for IR radiation heating which comprises an oxide of a transition metal, $ZrO_2$ and polyborosiloxane.

2. The IR radiation heating element according to claim 1, wherein the oxide of the transition metal is an oxide of a metal selected from the group consisting of iron, manganese, and copper.

3. The IR radiation heating element according to claim 1, wherein the oxide of the transition metal is an oxide of a metal selected from the group consisting of nickel, cobalt and chromium.

4. The IR radiation heating element according to claim 1, wherein the oxide of the transition metal is at least one oxide selected from the group consisting of $Al_2O_3$, $SiO_2$, $TiO_2$, $V_2O_5$, $Fe_2O_3$, NiO, $Y_2O_3$, $ZrO_2$, $La_2O_3$, $Co_2O_3$, CoO, $Mn_2O_3$, $MnO_2$, CuO, $Cu_2O$ and $Cr_2O_3$.

5. The IR radiation heating element according to claim 1, wherein particle surfaces of $ZrO_2$ is coated with at least one oxide selected the group consisting of $Al_2O_3$, $SiO_2$ and $TiO_2$.

6. The IR radiation heating element according to claim 1, wherein the oxide of the transition metal is a mixed oxide of the transition metals.

7. The IR radiation heating element according to claim 6, wherein the mixed oxide is a mixed oxide of iron, manganese and copper.

8. The IR radiation heating element according to claim 6, wherein the mixed oxide is a mixed oxide of nickel, copper and chromium.

9. The IR radiation heating element according to claim 6, wherein particle surfaces of $ZrO_2$ is coated with at least one oxide selected the group consisting of $Al_2O_3$, $SiO_2$ and $TiO_2$.

10. The IR radiation heating element according to claim 1, wherein the coating composition further comprises MgO and mica.

11. The IR radiation heating element according to claim 1, wherein the substrate is externally heatable.

12. The IR radiation heating element according to claim 1, wherein the substrate is internally heatable.

* * * * *